United States Patent [19]
McCullough

[11] Patent Number: 5,121,046
[45] Date of Patent: Jun. 9, 1992

[54] AUTOMATIC SERIES/PARALLEL BATTERY CONNECTING ARRANGEMENT

[75] Inventor: Randy L. McCullough, Charleston, W. Va.

[73] Assignee: Eagle Research Corporation, Scott Depot, W. Va.

[21] Appl. No.: 729,626

[22] Filed: Jul. 15, 1991

[51] Int. Cl.⁵ .............................................. H02J 7/04
[52] U.S. Cl. .................................... 320/16; 320/7; 307/71
[58] Field of Search ............... 320/6, 7, 15, 16, 17; 307/66, 71, 80, 85, 86

[56] References Cited

U.S. PATENT DOCUMENTS

| | | | |
|---|---|---|---|
| 3,748,500 | 7/1973 | Tam | 307/71 X |
| 3,871,383 | 3/1975 | Lee | 307/71 X |
| 4,009,431 | 2/1977 | Johnson | 307/71 X |
| 4,233,552 | 11/1980 | Baumbach | 320/7 |
| 4,297,629 | 10/1981 | Godard et al. | 320/7 |
| 4,315,162 | 2/1982 | Ferguson | 307/66 |
| 4,412,137 | 10/1983 | Hansen et al. | 307/71 X |
| 4,581,570 | 4/1986 | Mejia | 320/7 X |
| 4,788,452 | 11/1988 | Stanley | 307/71 |
| 4,814,631 | 3/1989 | Jackson | 307/71 X |

Primary Examiner—Steven L. Stephan
Assistant Examiner—Kristine Peckman
Attorney, Agent, or Firm—David L. Davis

[57] ABSTRACT

An arrangement for automatically connecting a first battery either in series with or in parallel to a second battery in order to maintain a minimum output terminal voltage including a voltage sensor which detects when the operating voltage of the batteries falls below a first threshold. When this occurs, switching devices are activated to convert the parallel connection of batteries into a series connection, thereby doubling the operating voltage. When the battery voltage rises above a second threshold which is at least twice the first threshold, the switching means are activated to reconnect the batteries in parallel.

5 Claims, 1 Drawing Sheet

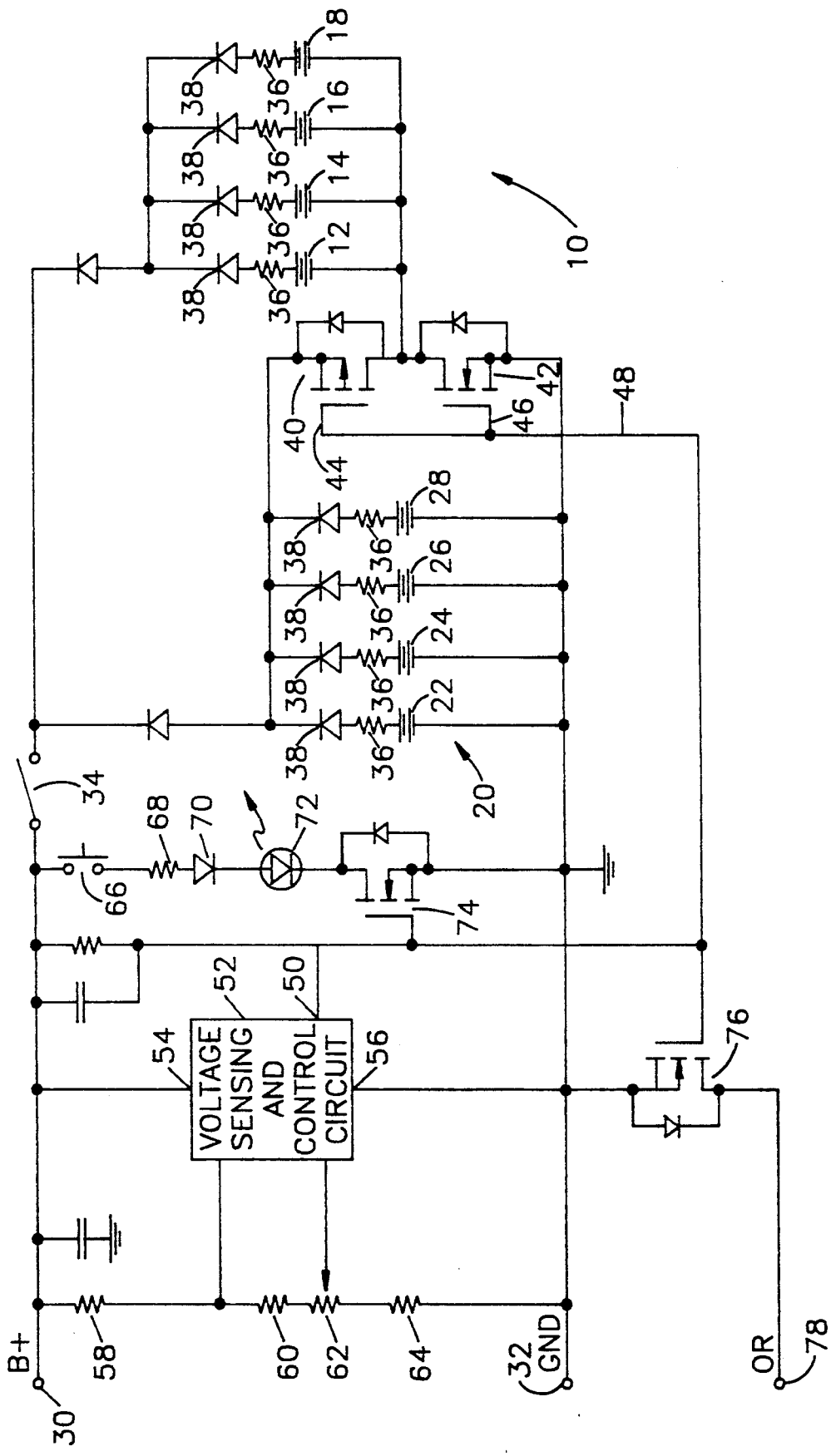

AUTOMATIC SERIES/PARALLEL BATTERY CONNECTING ARRANGEMENT

BACKGROUND OF THE INVENTION

This invention relates to battery power supplies and, more particularly, to an arrangement for insuring a minimum output voltage from such a supply.

Battery powered remote instruments for data collection and transmission utilized by utility companies are often subjected to harsh environmental conditions. Thus, a piece of equipment such as an electronic pressure recorder mounted on a gas pipeline may be located in a desert region where the daytime temperatures can exceed 120° F. or it may be located in an arctic region where nighttime temperatures can drop below −30° F. No matter where such equipment is installed, the electronic circuitry requires a minimum battery voltage for its operation. Thus, for example, equipment which utilizes a nominal nine volt battery supply requires a minimum of seven volts for proper operation. It is known that as the temperature of a battery decreases, its terminal voltage decreases. Thus, when the ambient temperature reaches −30° F., the terminal voltage of a nominal nine volt battery may drop below seven volts. Unless there is compensation for this effect, the electronic equipment powered by such a battery is rendered ineffective. It is therefore an object of the present invention to provide an arrangement which insures that the output voltage from a battery supply is maintained above a predetermined threshold.

SUMMARY OF THE INVENTION

The foregoing, and additional, objects are attained in accordance with the principles of this invention by providing an arrangement for selectively connecting a first battery either in series with or in parallel to a second battery in order to maintain a minimum output terminal voltage, the arrangement comprising first controllable switch means connected between the negative terminal of the first battery and the positive terminal of the second battery for selectively providing a first conductive path therebetween, second controllable switch means connected between the negative terminals of the first battery and the second battery for selectively providing a second conductive path therebetween, and control means coupled to the first and second batteries for sensing the voltage provided thereby and for controlling the first and second switch means to close the first conductive path and open the second conductive path when the sensed voltage drops below a first predetermined threshold and for controlling the first and second switch means to open the first conductive path and close the second conductive path when the sensed voltage rises above a second predetermined threshold.

BRIEF DESCRIPTION OF THE DRAWING

The foregoing will be more readily apparent upon reading the following description in conjunction with the drawing in which the single figure is a schematic diagram of an illustrative circuit incorporating the principles of this invention.

DETAILED DESCRIPTION

Referring now to the drawing, shown therein is a battery power supply which is reconfigurable to insure a minimum output voltage even under low temperature conditions where the terminal voltage of the individual batteries drops. This supply includes a first battery pack 10 comprising the parallel connection of four batteries 12, 14, 16 and 18, and a second battery pack 20 comprising the parallel connection of four batteries 22, 24, 26 and 28. The batteries 12, 14, 16, 18, 22, 24, 26 and 28 are all nominal nine volt batteries for providing a nominal nine volt supply across the output terminals 30 and 32 to electronic equipment utilizing such a supply, when the on/off switch 34 is closed. The resistors 36 are for the purpose of limiting the current from each of the batteries and the diodes 38 are to protect against the inadvertent reverse installation of a battery.

The electronic equipment supplied from the terminals 30, 32 requires, as is conventional, a minimum voltage for its proper operation. Thus, with a nominal nine volt supply, such minimum voltage may be on the order of seven volts. When the batteries are subject to low temperature conditions, their nominal nine volt terminal voltage may drop below that seven volt threshold. According to this invention, the battery packs 10, 20 are normally connected in parallel. However, if their terminal voltage drops below the seven volt threshold, the connection of the battery packs 10, 20 is reconfigured to a series connection, so that the overall terminal voltage becomes almost fourteen volts. Subsequently, upon warming of the battery packs 10, 20 so that their terminal voltages rise and the series connection terminal voltage goes above fourteen volts, the connection of the battery packs 10, 20 is again reconfigured to a parallel connection, with the overall voltage across the terminals 30 and 32 being greater than seven volts, satisfying the requirements of the electronic circuitry supplied from the terminals 30, 32.

For operation in accordance with the foregoing, there is provided a first controllable switch 40 and a second controllable switch 42. The first switch 40 is connected between the negative terminal of the first battery pack 10 and the positive terminal of the second battery pack 20. The second switch 42 is connected between the negative terminals of the first battery pack 10 and the second battery pack 20. Thus, when the first switch 40 is closed and the second switch 42 is open, the first battery pack 10 and the second battery pack 20 are connected in series. Conversely, when the first switch 40 is open and the second switch 42 is closed, the first battery pack 10 and the second battery pack 20 are connected in parallel. Illustratively, the switches 40, 42 are MOSFET devices. Preferably, the MOSFETs 40, 42 are complemental and have their control electrodes 44, 46 connected together so that only a single control lead 48 is required.

The control lead 48 is connected to the output terminal 50 of voltage sensing and control circuit 52. The circuit 52 is connected across the battery output terminals 30, 32 to sense the voltage provided by the battery packs 10 and 20. Depending upon the voltage level across the terminals 30, 32, the circuit 50 controls the MOSFETs 40, 42 to place the battery packs 10, 20 in either a series or parallel connection configuration. Illustratively, the circuit 52 comprises an integrated circuit ICL7665 Dual Over/Under Voltage Detector. The circuit 52 is arranged to sense the voltage applied across its terminals 54 and 56 and provide a low signal at its output terminal 50 when that voltage drops below a first threshold and to provide a high signal at its output terminal 50 when the sensed voltage rises above a second threshold. The thresholds are determined by the resistors 58, 60, 62 and 64, where the resistor 62 is utilized to set the first threshold and the resistor 58 is chosen to set the second threshold, the difference between the first and second thresholds being termed the hysteresis of the circuit 52.

Thus, when the voltage across the terminals 30, 32 drops below the first predetermined threshold, illustratively seven volts, the signal on the output terminal 50 to the lead 48 goes low. This low signal on the lead 48 places MOSFET 40 in the ON state and places MOSFET 42 in the OFF state. This causes the battery packs 10, 20 to be connected in series, thereby effectively doubling the voltage across the terminals 30, 32. As the batteries warm and their terminal voltage increases, eventually the voltage across the terminals 30, 32 will reach the second threshold. This second threshold must be at least twice the first threshold, since the battery packs 10, 20 are now in series. Accordingly, when the second threshold is reached, the signal on the output terminal 50 to the lead 48 goes high. This places the MOSFET 40 in the OFF state and places the MOSFET 42 in the ON state. Therefore, the battery packs 10, 20 are connected in parallel.

The switch 66, the resistor 68, the diode 70, the light emitting diode 72 and the MOSFET 74 comprise a "push-to-test" arrangement for indicating the operational state of the battery packs 10, 20. Under normal operating conditions, the terminal voltage of the batteries is sufficiently high that the battery packs 10, 20 are connected in parallel and the output signal on the lead 48 is high. With the signal on the lead 48 being high, the MOSFET 74 is in its ON state so that when the switch 66 is pushed, current will flow through the light emitting diode 72, thereby providing an indication of normal operation. Conversely, when the terminal voltage of the batteries is low and the battery packs 10, 20 are connected in series, i.e., "stacked", the signal on the lead 48 is low and the MOSFET 74 is in its OFF state, so that pushing the switch 66 will not result in current flow through the light emitting diode 72.

The MOSFET 76 is provided for electronically indicating the operational state of the battery supply to the electronic equipment to which it is connected. This electronic equipment is connected to the MOSFET 76 via the "on reserve" terminal 78. Within the electronic equipment there is a pullup resistor (not shown). Under normal operating conditions, when the signal on the lead 48 is high, the MOSFET 76 is in its ON state. Its drain will therefore pull the external pullup resistor to a low state. When the battery packs 10, 20 are operating in the "stacked" mode, the signal on the lead 48 is low and the MOSFET 76 is in its OFF state. Therefore, its drain will be pulled to a high state by the external pullup resistor, thereby indicating that the battery supply is operating "on reserve".

Accordingly, there has been disclosed an arrangement for automatically connecting a first battery either in series with or in parallel to a second battery in order to maintain a minimum output terminal voltage. While an exemplary embodiment has been disclosed herein, it will be appreciated by those skilled in the art that various adaptations and modifications to the disclosed embodiment may be made without departing from the spirit and scope of this invention, as defined by the appended claims.

I claim:

1. An arrangement for automatically connecting a first battery either in series with or in parallel to a second battery in order to maintain a minimum output terminal voltage, the arrangement comprising:

first controllable switch means connected between the negative terminal of said first battery and the positive terminal of said second battery for selectively providing a first conductive path therebetween;

second controllable switch means connected between the negative terminals of said first battery and said second battery for selectively providing a second conductive path therebetween; and control means coupled to said first and second batteries for sensing the voltage provided thereby and for controlling said first and second switch means to close said first conductive path and open said second conductive path when the sensed voltage drops below a first predetermined threshold and for controlling said first and second switch means to open said first conductive path and close said second conductive path when the sensed voltage rises above a second predetermined threshold.

2. The arrangement according to claim 1 wherein said first switch means includes a first MOSFET and said second switch means includes a second MOSFET complemental to said first MOSFET, the arrangement further including means for connecting together the control electrodes of said first and second MOSFETS.

3. The arrangement according to claim 1 further including means for selectively varying said first and second predetermined thresholds.

4. The arrangement according to claim 1 further including means for providing an indication of the status of said first and second switch means.

5. The arrangement according to claim 1 wherein said second predetermined threshold is at least twice said first predetermined threshold.

* * * * *